United States Patent [19]
Tsuya

[11] 3,882,584
[45] May 13, 1975

[54] METHOD FOR MANUFACTURE OF ABRASION-RESISTANT SLIDING MEMBER

[75] Inventor: Yuko Tsuya, Tokyo, Japan

[73] Assignee: Agency of Industrial Science and Technology, Japan

[22] Filed: Mar. 19, 1974

[21] Appl. No.: 452,667

[30] Foreign Application Priority Data
Mar. 23, 1973 Japan.................................. 48-33217

[52] U.S. Cl...... 29/149.5 S; 29/149.5 NM; 308/5 R
[51] Int. Cl............................................. B21d 53/10
[58] Field of Search 29/148.4 L, 149.5 NM, 149.5 S, 29/155 R, 530, 417; 308/3 R, 5 R, DIG. 9

[56] References Cited
UNITED STATES PATENTS

| | | | |
|---|---|---|---|
| 1,153,647 | 9/1915 | Smalley | 308/5 R |
| 2,187,626 | 1/1940 | Merriman | 308/5 R X |
| 3,613,202 | 10/1971 | Soder | 29/149.5 NM |
| 3,794,390 | 2/1974 | Kilcher | 308/3 R |

*Primary Examiner*—C. W. Lanham
*Assistant Examiner*—D. C. Reiley, III
*Attorney, Agent, or Firm*—Oblon, Fisher, Spivak, McClelland & Maier

[57] ABSTRACT

A sliding member having threads of solid lubricant embedded in a densely distributed state is obtained by drilling or casting a multiplicity of parallel holes into a metal blank through one terminal face thereof, filling the holes with a solid lubricant and elongating the lubricant-containing metal block in the direction of said holes by means of a rolling machine.

2 Claims, No Drawings

METHOD FOR MANUFACTURE OF ABRASION-RESISTANT SLIDING MEMBER

BACKGROUND OF THE INVENTION

This invention relates to a method for the manufacture of an abrasion-resistant sliding member.

As a supporting stand for a bridge girder, for example, there has heretofore been in use a sliding plate which has a plastic material and a solid lubricant embedded in holes drilled in a foundation plate. However, the holes in the foundation plate are relatively large in diameter and are widely separated from one another. If the distance travelled by the member which slides on this sliding plate is small, then there is a possibility that when the said member slides on the sliding plate it will contact only the portion of the sliding plate which has no solid lubricant. In such a case, the solid lubricant cannot fulfil its function. It is, therefore, desirable that the holes to be filled with the solid lubricant should be decreased in size to some extent and the spaces separating the holes should likewise be reduced in size. From the machining point of view, however, it is extremely difficult to drill a multiplicity of holes of a minute diameter in a metal blank. Even if the multiplicity of such holes are successfully drilled in the metal blank, it is still more difficult and troublesome to fill all the holes to capacity with the solid lubricant.

An object of this invention is to provide a method by which a sliding member having threads of solid lubricant embedded in a densely distributed state is manufactured with extreme ease.

SUMMARY OF THE INVENTION

The method of this invention accomplishes this object by drilling a multiplicity of parallel holes of a diameter large enough for easy machining into a metal blank through one terminal face thereof and then filling the holes with a solid lubricant. The metal block which now has a multiplicity of holes filled with the solid lubricant is elongated in the direction of the said holes by means of a rolling machine. Because of this elongation, the cross section of the metal block and that of the holes drilled in the metal block are contracted in inverse proportion to the magnitude of said elongation, with the result that the holes filled with the solid lubricant are slenderized and the spaces separating them are narrowed down so that the threads of solid lubricant will be distributed densely in the contracted cross section of the metal block. The metal block obtained as described above is cut into pieces each of the length required for use as a sliding member. Since the sliding member manufactured by the method of this invention has the solid lubricant contained in the multiplicity of fine holes distributed densely therein, the contact face of the sliding member is constantly supplied with the solid lubricant. Ample supply of the solid lubricant is obtained even where the distance travelled by another member which slides on the sliding member is small.

Other object and other characteristic features of this invention will become apparent from the following more detailed description of the invention.

DETAILED DESCRIPTION OF THE INVENTION

Sliding members containing solid lubricant have heretofore been manufactured by a method comprising the steps of mixing a solid lubricant and a metal both in a pulverized state and subsequently sintering the resultant mixture or by a method comprising the steps of drilling holes in a metal blank and filling the holes with a solid lubricant, for example. The sliding members manufactured by the former method have the disadvantage that they are frail mechanically. Those manufactured by the latter method are not flawless either. The holes are drilled to a relatively large diameter in the metal blank to permit unhindered introduction of the solid lubricant. Therefore, the mechanical strength of the finished sliding member is degraded in proportion as the total number of such holes drilled in the metal blank is increased. If a multiplicity of holes of a smaller diameter are drilled in order to avoid imparing the mechanical strength, it now becomes difficult to fill the holes satisfactorily with the solid lubricant. In view of the true status of affairs described above, the inventors made various studies in search for a sliding member having solid lubricant embedded therein in a densely distributed state and enjoying sufficient mechanical strength. They have consequently found that a sliding member having threads of solid lubricant embedded in a densely distributed state and enjoying excellent mechanical strength is obtained by a process comprising the steps of drilling a multiplicity of parallel holes into a metal blank through one terminal face thereof, filling the holes with a solid lubricant and thereafter elongating the metal block in the direction of the said holes as by a swaging or rolling means for thereby causing the holes and the spaces separating them to be contracted in the cross-sectional directions.

The material for the metal blank to be used herein may be any of the metals which are suitable for the various uses to be found for the sliding member. Examples of suitable metals are steel, stainless steel, Nichrome, copper alloys and silver alloys. In consideration of the fact that the metal blank is to be pierced by a multiplicity of holes and then elongated, the metal bland is ordinarily obtained in the form of a cylinder or square rod having a large cross section and a small length.

A multiplicity of parallel holes are drilled into this metal blank through one terminal face thereof as by means of a drill. The diameter of these holes should be large enough for easy introduction of the solid lubricant and is generally on the order of from 3 to 5 cm. The spaces which separate these holes are suitably selected depending on the mechanical strength expected of the sliding member to be manufactured and on the required density of solid lubricant distribution. Drilling is not necessarily the only means available for the formation of these holes. As occasion permits, the holes may be formed by the plastic molding method. For example, holes 5 mm in diameter may be spaced by intervals of 5 mm in a cylinder of copper 50 mm long and 50 mm across.

The solid lubricant with which these holes are to be filled may be any of the conventionally known lubricants such as boron nitride, graphite, molybdenum disulfide, tungsten disulfide, fluoride of graphite, calcium fluoride, and combinations thereof. Such a solid lubricant powder is pressed into the holes with the aid of a compressor or the like. Of course, it is permissible to have the solid lubricant suspended in advance in a suitable carrier and, in the form of suspension, pressed into the holes by means of a compressor.

The metal block in which the solid lubricant has been incorporated as described above is now elongated in the direction of the said holes by means of a suitable rolling machine. The ratio of elongation is so determined as to suit the particular use to which the finished sliding member is put. When a metal blank of square bar 20 cm × 20 cm in cross section in which holes 5 mm in diameter are spaced at intervals of 1 cm is elongated to 10 times the original length, for example, there is obtained an elongated metal bar which incorporates therein threads of solid lubricant 0.5 mm across distributed at intervals of about 1 mm. This bar is cut into pieces of proper length and put to use. Alternatively, the original metal blank may be cut in advance into pieces of a length selected by taking into due consideration the required ratio of elongation. The cut metal blank is then pierced with holes and, after the holes have been filled with the solid lubricant, elongated to the said required ratio and then immediately put to use.

After the holes have been filled with the solid lubricant, the both terminal faces of the metal block are sealed with suitable metal sheets so that the solid lubricant will be prevented from oozing out because of the pressure exerted on the metal block in the course of the elongation. As is clear from the foregoing description, a sliding member having threads of solid lubricant embedded at a desired density of distribution can be manufactured with extreme ease by the method of this invention. This sliding member enjoys high mechanical strength. Since the numerous fine holes formed in the metal sliding member are filled with the solid lubricant, the contact face of the member is constantly supplied with the lubricant. Even when the sliding member is used in such parts as electric contacts which involve a very small distance of sliding motion, it ensures ample supply of solid lubricant. Thus, the sliding member enjoys various advantages.

The following examples illustrate the process of this invention, but are not construed as limiting the invention.

EXAMPLE 1

In two copper cylinders 50 mm in length and 50 mm in diameter, holes 8 mm in diameter were formed at intervals of 5 mm by means of a drill. A solid lubricant composed of tungsten disulfide and graphite at a voluminal ratio of 1 : 3 was pushed into the holes formed in one of the cylinders by a compressor. A solid lubricant composed solely of molybdenum disulfide was pushed into the holes formed in the other cylinder by a compressor. The terminal faces through which the holes had been drilled were sealed by attaching thereto a copper sheet 10 mm in thickness. The cylinders were elongated by means of a rolling machine until they were slenderized to one tenth the original diameter. In each of the elongated cylinders, the holes were 0.8 mm in diameter, 0.5 mm apart from one another and about 5,000 mm in length. The holes were found to be tightly filled with the solid lubricants. The cylinders were cut into pieces each of a thickness of 10 mm and tested for friction coefficient, wear rate and compressive fracture stress. The results were as shown in Table 1.

For the purpose of comparison, conventional sliding members each formed to identical dimensions by mixing a metal and a different kind of solid lubricant, both in a pulverized form, and thereafter sintering the resulting mixture and an identical cylinder of copper were similarly tested for friction coefficient, wear rate and compressive fracture stress. The results are also shown in Table 1. The sliding members for comparison were produced by mixing copper powder with a solid lubricant composed of tungsten disulfide and graphite at a voluminal ratio of 1 : 3 for one of the members and with only molybdenum disulfide for the other member respectively at a ratio (voluminal) of 20% based on copper, compression molding the resultant mixtures under a pressure of 6 tons/cm$^2$ and thereafter sintering the molded blocks in a vacuum furnace at 800°C for 3 hours.

Table 1

| Sliding member<br>Solid lubricant<br>Item of test | Sliding member by this invention | | Sliding member by sintering method | | Copper |
|---|---|---|---|---|---|
| | $WS_2$ + graphite | $M_oS_2$ | $WS_2$ + graphite | $M_oS_2$ | |
| Friction coefficient | | | | | |
| 5 kg/cm$^2$ | 0.03 | 0.03 | 0.15 | 0.7 | 1.2 |
| 50 kg/cm$^2$ | 0.06 | 0.02 | 0.11 | 0.6 | 1.2 |
| Wear rate (mm$^2$/kg) | | | | | |
| 5 kg/cm$^2$ | $1.3 \times 10^{-8}$ | $2.4 \times 10^{-8}$ | $2.5 \times 10^{-6}$ | $4 \times 10^{-5}$ | $2.1 \times 10^{-3}$ |
| 50 kg/cm$^2$ | $1.5 \times 10^{-8}$ | $3.0 \times 10^{-8}$ | $1 \times 10^{-6}$ | $7 \times 10^{-5}$ | $3.1 \times 10^{-3}$ |
| Compressive fracture stress (kg/mm$^2$) | 600 | 600 | 150 | 248 | — |

Referring to the data of the preceding table, the tests for friction coefficient, wear rate and compressive fracture stress were carried out as described below.

Friction and wear test:

A copper piece was held in contact with the face of a given sliding member containing the exposed solid lubricant and the sliding member, under a load of 5 kg/cm$^2$, was rotated at a rate of 500 rpm for 30 minutes to measure friction coefficient and wear rate. A second test was conducted under the same conditions except that the load was increased to 50 kg/cm$^2$.

Compressive fracture stress test:

A test piece, 1 cm$^3$, cut from a given sliding member was placed so that an increasing load was exerted on the face of the test piece containing the exposed solid lubricant. The load was increased until the test piece broke, at which time the pressure reading was taken.

It is clear from Table 1 that, in spite of having the same composition, the sliding members according to the present invention far excelled those produced by the sintering method in terms of friction coefficient and wear rate and showed compressive fracture stress about 2.4 times as great.

EXAMPLE 2

Sliding members were formed by following the procedure of Example 1, except cylinders of nickel were used in place of those of copper and a mixture consist- Table 3

| Sliding member | Sliding member according to this invention | | | Sliding member by sintering method | | |
| --- | --- | --- | --- | --- | --- | --- |
| Solid lubricant<br>Item of test | $WS_2$ + graphite | $WS_2$ | $M_oS_2$ | $WS_2$ + graphite | $WS_2$ | $M_oS_2$ |
| Friction coefficient | 0.1 | 0.06 | 0.06 | 0.2 | 0.4 | 0.7 |
| Wear rate (mm²/kg) | $2\times10^{-8}$ | $1\times10^{-8}$ | $1\times10^{-9}$ | $2\times10^{-6}$ | $2\times10^{-5}$ | $4\times10^{-4}$ | ing of tungsten disulfide and graphite at a ratio of 3 : 7, tungsten disulfide alone and molybdenum disulfide alone were placed as solid lubricants into the holes of the respective cylinders, which were subsequently elongated. These sliding members were tested for friction coefficient and wear rate under a pressure of 50 kg/cm². The results were as shown in Table 2.

For the purpose of comparison, powdered nickel and tungsten disulfide were mixed at a ratio of 90 : 10 (by volume) and powdered nickel and moybdenum disulfide were mixed at a ratio of 90 : 10 (by volume) and the resultant mixtures were sintered by following the procedure of Example 1 to produce sliding members, which were similarly tested for friction coefficient and wear rate under 50 kg/cm². The results are also shown in the table.

Table 2

| Sliding member | Sliding member according to this invention | | | Sliding member by sintering method | |
| --- | --- | --- | --- | --- | --- |
| Solid lubricant<br>Item of test | $WS_2$ + graphite | $WS_2$ | $M_oS_2$ | $WS_2$ | $M_oS_2$ |
| Friction coefficient | 0.05 | 0.06 | 0.06 | 0.7 | 0.8 |
| Wear rate (mm²/kg) | $7\times10^{-9}$ | $5\times10^{-8}$ | $4\times10^{-9}$ | $8\times10^{-7}$ | $5\times10^{-6}$ |

EXAMPLE 3

Sliding members were produced by faithfully repeating the procedure of Example 2, except an alloy consisting of nickel and copper at a ratio of 20 : 70 was used in place of nickel. The sliding members were then tested for friction coefficient and wear rate under 50 kg/cm². The results were as shown in Table 3.

For the purpose of comparison, sliding members by the sintering method were produced by following the procedure of Example 1, except a powder metal composed of nickel and copper at a ratio of 20 : 70 was mixed with the solid lubricant at a ratio of 90 : 10.

EXAMPLE 4

Sliding members were formed by following the procedure of Example 2, except SK-5, SK-2 and stainless steel were used in place of nickel and a mixture consisting of molybdenum disulfide and graphite at a ratio of 4 : 6, tungsten disulfide alone and a mixture consisting of tungsten disulfide and graphite at a ratio of 5 : 10 were used respectively as solid lubricants. The sliding members were tested for friction coefficient and wear rate under 50 kg/cm². The results were as shown in Table 4.

For the purpose of comparison, a sliding member formed by sintering a mixture consisting of SK-5, molybdenum disulfide and graphite at a ratio of 95: 4 : 6, a sliding member formed by sintering a mixture consisting of SK-2 and tungsten disulfide at a ratio of 95 : 5 and a sliding member formed by sintering a mixture consisting of stainless steel, tungsten disulfide and graphite at a ratio of 85 : 5 : 10 were similarly tested for friction coefficient and wear rate. The results are also shown in the table.

Table 4

| Sliding member | Sliding member according to this invention | | | Sliding member by sintering method | | |
| --- | --- | --- | --- | --- | --- | --- |
| | SK-5 | SK-2 | Stainless steel | SK-5 | SK-2 | Stainless steel |
| Solid lubricant<br>Item of test | $M_oS_2$ + graphite | $WS_2$ | $WS_2$ + graphite | $M_oS_2$ + graphite | $WS_2$ | $WS_2$ + graphite |
| Friction coefficient | 0.08 | 0.07 | 0.07 | 0.08 | 0.2 | 0.4 |
| Wear rate (mm²/kg) | $4\times10^{-9}$ | $3\times10^{-9}$ | $2\times10^{-9}$ | $3\times10^{-6}$ | $2\times10^{-6}$ | $4\times10^{-4}$ |

What is claimed is:

1. A method for the manufacture of an abrasion-resistant sliding member consisting essentially of the steps of forming a multiplicity of parallel holes into a metal blank through one terminal face thereof, filling the holes with a solid lubricant, scaling the terminal face so that the solid lubricant cannot substantially enude out during the subsequent elongation, and elongating the solid lubricant-containing metal block in the direction of the sand holes for thereby causing the cross section of the metal to contract simultaneously with the cross section of the lubricant-filled holes.

2. A method according to claim 1, wherein the material of the metal blank is one member selected from the group consisting of copper, nickel, nickel alloy and stainless steel.

* * * * *